(12) United States Patent
Yoon et al.

(10) Patent No.: US 11,721,874 B2
(45) Date of Patent: Aug. 8, 2023

(54) BUS BAR ASSEMBLY

(71) Applicant: LG Chem, Ltd., Seoul (KR)

(72) Inventors: Doo Han Yoon, Daejeon (KR); Jong Woon Choi, Daejeon (KR); Jae Hun Yang, Daejeon (KR)

(73) Assignee: LG Energy Solution, Ltd.

( * ) Notice: Subject to any disclaimer, the term of this patent is extended or adjusted under 35 U.S.C. 154(b) by 214 days.

(21) Appl. No.: 16/954,789

(22) PCT Filed: Jul. 23, 2019

(86) PCT No.: PCT/KR2019/009064
§ 371 (c)(1),
(2) Date: Jun. 17, 2020

(87) PCT Pub. No.: WO2020/022735
PCT Pub. Date: Jan. 30, 2020

(65) Prior Publication Data
US 2021/0091350 A1    Mar. 25, 2021

(30) Foreign Application Priority Data
Jul. 26, 2018  (KR) ........................ 10-2018-0087149

(51) Int. Cl.
*H01M 50/502* (2021.01)
*H01M 50/50* (2021.01)
*H01M 10/48* (2006.01)
*H01M 50/569* (2021.01)
*H01M 50/211* (2021.01)

(52) U.S. Cl.
CPC ......... *H01M 50/502* (2021.01); *H01M 10/48* (2013.01); *H01M 50/211* (2021.01);
(Continued)

(58) Field of Classification Search
CPC .. H01M 50/20; H01M 50/502; H01M 50/531; H01M 2220/20; H01M 10/48;
(Continued)

(56) References Cited

U.S. PATENT DOCUMENTS 9,583,748 B2 *  2/2017  Choi ................... H01M 50/293
2006/0040527 A1  2/2006  Shirota
(Continued)

FOREIGN PATENT DOCUMENTS

CN    103069284 A    4/2013
CN    105556318 A    5/2016
(Continued)

OTHER PUBLICATIONS

Extended European Search Report for Application No. 19841784.2, dated Mar. 31, 2021, 6 pages.
(Continued)

*Primary Examiner* — Michael L Dignan
(74) *Attorney, Agent, or Firm* — Lerner David LLP

(57) ABSTRACT

A bus bar assembly includes a frame, a plurality of sensing bus bars integrally provided on the frame, an inter bus bar configured to connect any one pair of sensing bus bars, among the plurality of sensing bus bars, to each other, and a terminal bus bar configured to connect any one of the plurality of sensing bus bars to an external terminal.

6 Claims, 8 Drawing Sheets

(52) U.S. Cl.
CPC ......... *H01M 50/50* (2021.01); *H01M 50/569* (2021.01); *H01M 2220/20* (2013.01)

(58) Field of Classification Search
CPC .. H01M 50/211; H01M 50/50; H01M 50/503; H01M 50/507; H01M 50/569; H01M 50/204; Y02E 60/10
See application file for complete search history.

(56) References Cited

U.S. PATENT DOCUMENTS

| | | |
|---|---|---|
| 2010/0019572 A1 | 1/2010 | Kudo et al. |
| 2013/0143086 A1 | 6/2013 | Lee et al. |
| 2014/0065467 A1 | 3/2014 | Choi et al. |
| 2016/0133898 A1 | 5/2016 | Choi et al. |
| 2016/0164054 A1* | 6/2016 | Yamamoto .......... H01M 50/572 429/61 |
| 2016/0248070 A1* | 8/2016 | Ahn .................. H01M 50/262 |
| 2016/0268652 A1* | 9/2016 | Eom ................. H01M 10/4285 |
| 2016/0315356 A1 | 10/2016 | Moon et al. |
| 2018/0138484 A1* | 5/2018 | Choi .................... H01M 50/50 |
| 2018/0159096 A1* | 6/2018 | Kim ...................... B23K 26/21 |
| 2019/0001838 A1 | 1/2019 | Choi et al. |
| 2019/0189979 A1 | 6/2019 | Choi et al. |
| 2019/0348720 A1* | 11/2019 | Oh .................... H01M 50/567 |

FOREIGN PATENT DOCUMENTS

| | | |
|---|---|---|
| CN | 105794015 A | 7/2016 |
| CN | 107771362 A | 3/2018 |
| CN | 108140778 A | 6/2018 |
| EP | 3076456 A1 | 10/2016 |
| JP | 2006060956 A | 3/2006 |
| JP | 5189920 B2 | 4/2013 |
| JP | 2014103123 A | 6/2014 |
| JP | 2014519153 A | 8/2014 |
| JP | 2015035397 A | 2/2015 |
| KR | 20130080023 A | 7/2013 |
| KR | 101463196 B1 | 11/2014 |
| KR | 101547401 B1 | 8/2015 |
| KR | 20150115250 A | 10/2015 |
| KR | 20170054878 A | 5/2017 |
| KR | 101743696 B1 | 6/2017 |
| KR | 20170103222 A | 9/2017 |
| KR | 20180038253 A | 4/2018 |

OTHER PUBLICATIONS

International Search Report from Application No. PCT/KR2019/009064 dated Oct. 30, 2019, 2 pages.
Search Report dated Jan. 24, 2022 from the Office Action for Chinese Application No. 201980006225.9 dated Jan. 29, 2022, 3 pages.

* cited by examiner

BUS BAR ASSEMBLY

CROSS-REFERENCE TO RELATED APPLICATIONS

This application is a national phase entry under U.S.C. § 371 of International Application No. PCT/KR2019/009064, filed Jul. 23, 2019, published in Korean, which claims the benefit of priority to Korean Patent Application No. 10-2018-0087149 filed on Jul. 26, 2018, the disclosures of which are incorporated herein by reference in their entireties.

TECHNICAL FIELD

The present invention relates to a bus bar assembly mounted to a battery module having a plurality of battery cells so as to be electrically connected to the plurality of battery cells.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in medium- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential component of a hybrid vehicle or an electric vehicle is a battery pack configured to supply electric power to a motor.

A hybrid vehicle or an electric vehicle has advantages in that fuel economy is high and no pollutant is discharged or the amount of a pollutant is reduced, compared to a vehicle using only an internal combustion engine, since it is possible to obtain driving force from the battery pack. A battery pack used in a hybrid vehicle or an electric vehicle includes a battery module including a plurality of battery cells, and the plurality of battery cells is connected to each other in series and/or in parallel, whereby the capacity and the output of the battery module are increased.

Electrode leads are connected to each other in order to electrically connect the plurality of battery cells in the battery module, and connections between the electrode leads may be welded in order to maintain the state in which the electrode leads are connected to each other. The battery module may have a function of detecting voltage of the plurality of battery cells. To this end, bus bars configured to detect voltage of the plurality of battery cells may be connected to the connections between the electrode leads by welding, etc.

In this structure, a plurality of electrode leads withdrawn from the plurality of battery cells is disposed in various forms, and it is necessary to construct circuits having various forms in order to connect the plurality of electrode leads disposed in various forms to each other.

According to the conventional art, a plurality of components having various forms is used in a combined form in order to construct circuits having various forms. However, a process of separately manufacturing a plurality of components having various forms and combining the components for use is complicated.

DISCLOSURE

Technical Problem

The present invention has been made in view of the above problems, and it is an object of the present invention to provide a bus bar assembly capable of realizing various circuits configured to connect electrode leads of a plurality of battery cells to each other using simple and unified components.

Technical Solution

A bus bar assembly according to an embodiment of the present invention includes a frame; a plurality of sensing bus bars integrally provided on the frame; an inter bus bar configured to connect any one pair of sensing bus bars, among the plurality of sensing bus bars, to each other; and a terminal bus bar configured to connect any one of the plurality of sensing bus bars to an external terminal.

The frame and the plurality of sensing bus bars may be integrally formed by adding a material constituting the frame to the plurality of sensing bus bars.

Each sensing bus bar of the plurality of sensing bus bars may be formed in a straight shape and may have two contact points.

The inter bus bar may be formed in a straight shape and may have two contact points connected respectively to contact points of any one pair of sensing bus bars, among the plurality of sensing bus bars.

The terminal bus bar may be formed in a bent shape and may have two contact points connected respectively to one of the two contact points of one of the plurality of sensing bus bars and to the external terminal.

A plurality of through-holes, through which electrode leads of a plurality of battery cells extend, respectively, may be formed in the frame.

The frame may be any one of a first type frame and a second type frame, the first type frame may have a plurality of through-holes including a single through-hole, through which two electrode leads of a plurality of battery cells extend together, the single through-hole formed between any one pair of sensing bus bars, among the plurality of sensing bus bars, and the second type frame may have a plurality of through-holes including two through-holes, through which two electrode leads of a plurality of battery cells extend, respectively, the two through-holes formed between any one pair of sensing bus bars, among the plurality of sensing bus bars.

The present invention provides a battery module having a plurality of battery cells and the bus bar assembly and a battery pack including the battery module.

BEST MODE

Hereinafter, a bus bar assembly according to an embodiment of the present invention will be described with reference to the accompanying drawings.

Figure 1:
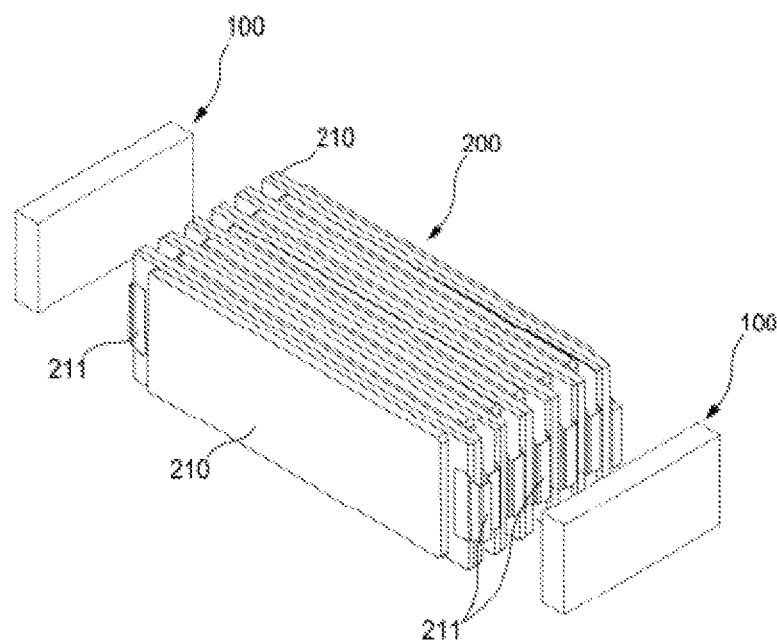
FIG. 1 is a perspective view schematically showing a battery module, to which a bus bar assembly according to an embodiment of the present invention is applied.

As shown in FIG. 1, a battery module, to which the bus bar assembly 100 according to the embodiment of the present invention is applied, includes a battery cell assembly 200.

The battery cell assembly 200 includes a plurality of battery cells 210. For example, each of the battery cells 210 may be a pouch-shaped battery cell. In this case, each battery cell 210 may have an electrode assembly and a pouch configured to accommodate the electrode assembly. The electrode assembly may be constructed by assembling a plurality of electrode plates (positive electrode plates and negative electrode plates) and a plurality of separators. Each of the electrode plates of the electrode assembly is provided with an electrode tab, and a plurality of electrode tabs may be connected to an electrode lead 211. The electrode lead 211 is exposed outwards from the pouch, and an exposed portion of the electrode lead 211 may function as an electrode terminal of each battery cell 210.

The electrode lead 211 may include a positive electrode lead and a negative electrode lead. The electrode leads 211 of the plurality of battery cells 210 may be connected to each other in parallel or in series by welding. As a result, the plurality of battery cells 210 may be electrically connected to each other.

For example, the plurality of positive electrode leads may protrude from the front of the battery cell assembly 200, and the plurality of negative electrode leads may protrude from the rear of the battery cell assembly 200. In this case, there is no interference between the positive electrode leads and the negative electrode leads. In another example, the positive electrode leads and the negative electrode leads may protrude from the front or the rear of the battery cell assembly 200.

The bus bar assembly 100 may be mounted to the front or the rear of the battery cell assembly 200. As shown in FIGS. 2 to 5, the bus bar assembly 100 may include a frame 110; a plurality of sensing bus bars 120 integrally provided at the frame 110; an inter bus bar 130 configured to electrically connect any one pair of sensing bus bars 120, among the plurality of sensing bus bars 120, to each other; and a terminal bus bar 140 configured to electrically connect any one of the plurality of sensing bus bars 120 to an external terminal.

The frame 110 may be coupled to the battery cell assembly 200 using various methods, such as welding, bolting, or riveting. In the case in which the number of battery cells 210 constituting the battery cell assembly 200 is uniform (i.e. in the case in which the overall sizes of the front and the rear of the battery cell assembly 200 are identical to each other), the same type of frame 110 may be applied to various other types of battery cell assemblies 200 that are different from each other in the form in which the plurality of battery cells 210 is disposed.

In the embodiment of the present invention, the construction in which the battery cell assembly 200 includes a total of 12 battery cells 210 is described. Consequently, the frame 110 described in the embodiment of the present invention may be applied to a battery cell assembly 200 including a total of 12 battery cells 210, even though the construction in which the plurality of battery cells 210 is disposed is changed.

However, the present invention is not limited as to the number of battery cells 210, and the frame 110 may be constructed so as to correspond to the number of battery cells 210 (i.e. the sizes of the front and the rear of the battery cell assembly 200), in the same principle as in the embodiment of the present invention, such that the frame 110 can be applied to various battery cell assemblies 200.

The frame 110 may be any one type of frame selected from between two types of frames 111 and 112. The two types of frames 110 may be classified depending on the form in which the plurality of battery cells 210 is disposed. For example, the two types of frames 110 may be classified depending on whether the battery module has a structure in which electrode leads 211 having different polarities protrude separately from the front and the rear of the battery cell assembly 200 or a structure in which electrode leads 211 having different polarities protrude together from the front and the rear of the battery cell assembly 200.

Figure 2:
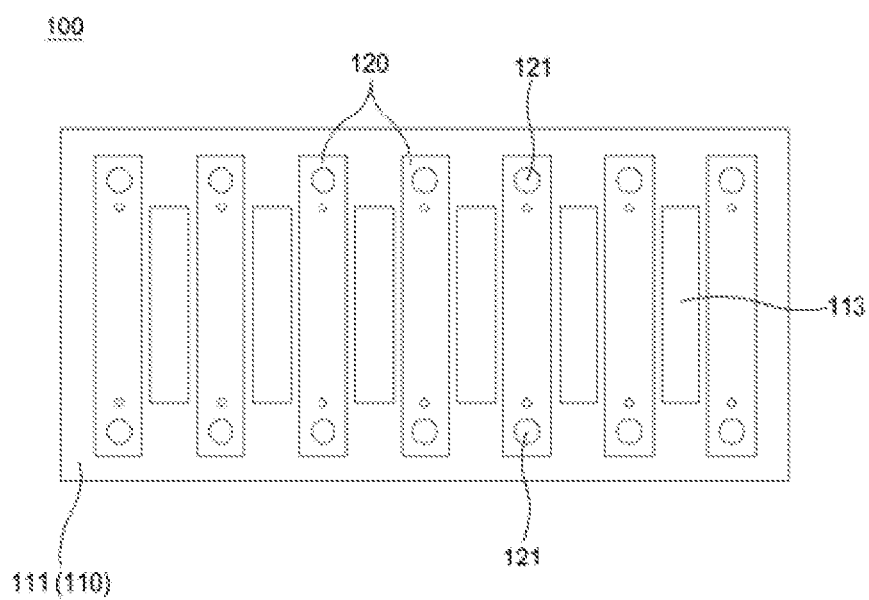
FIG. 2 is a view schematically showing a first type frame and a sensing bus bar provided in the bus bar assembly according to the embodiment of the present invention.
Figure 3:
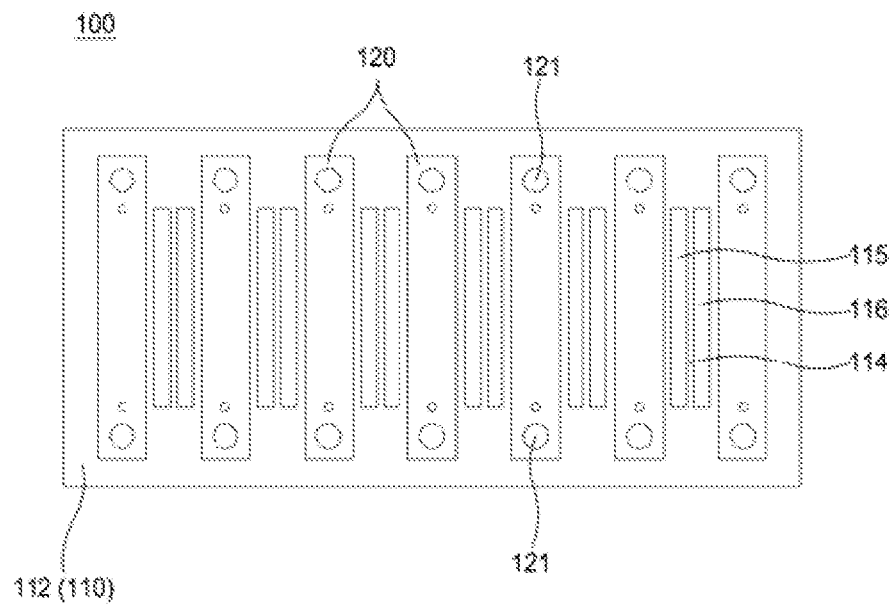
FIG. 3 is a view schematically showing a second type frame and a sensing bus bar provided in the bus bar assembly according to the embodiment of the present invention.

The two types of frames 110 include a first type frame 111, shown in FIG. 2, and a second type frame 112, shown in FIG. 3.

The first type frame 111 and the plurality of sensing bus bars 120 may be integrally formed. For example, the first type frame 111 and the plurality of sensing bus bars 120 may be integrally formed through an insert injection process in which a material that constitutes the first type frame 111 is injected into a mold in the state in which the plurality of sensing bus bars 120 is inserted into the mold. A plurality of through-holes 113 may be formed in the first type frame 111. The electrode leads 211 of the battery cells 210 may be exposed outwards through the plurality of through-holes 113. The plurality of through-holes 113 may be simultaneously formed with the other portion of the first type frame 111 in the insert injection process. For example, the first type frame 111 may be applied to a construction in which two electrode leads 211 are exposed together through each through-hole 113.

In the same manner as in the first type frame 111, the second type frame 112 and the plurality of sensing bus bars 120 may be integrally formed. For example, the second type frame 112 and the plurality of sensing bus bars 120 may be integrally formed through an insert injection process in which a material that constitutes the second type frame 112 is injected into a mold in the state in which the plurality of sensing bus bars 120 is inserted into the mold. A plurality of through-holes 115 and 116 may be formed in the second type frame 112. A pair of through-holes 115 and 116 is formed between a pair of sensing bus bars 120, among the plurality of sensing bus bars 120. The pair of through-holes 115 and 116 may be formed so as to be spaced apart from each other by a separation portion 114. Two electrode leads 211 are exposed outwards through the pair of through-holes 115 and 116, respectively. The plurality of through-holes 115 and 116 and the separation portions 114 may be simultaneously formed with the other portion of the second type frame 112 in the insert injection process. In the case of the second type frame 112, the two electrode leads 211 are exposed through the pair of through-holes 115 and 116, respectively, and are separated from each other by the separation portion 114, whereby the two electrode leads 211 may not contact each other. Consequently, the second type frame 112 may be applied when two electrode leads 211, among a plurality of electrode leads 211, must not contact each other.

Each of the sensing bus bars 120 may be formed in a straight shape. Each sensing bus bar 120 may have two contact points 121. An inter bus bar 130 may be connected to contact points 121 of a pair of sensing bus bars 120, among the plurality of sensing bus bars 120, by welding, etc., whereby the pair of sensing bus bars 120 may be electrically connected to each other via the inter bus bar 130. In addition, a terminal bus bar 140 may be connected to a contact point 121 of an outermost sensing bus bar 120, among the plurality of sensing bus bars 120, whereby the sensing bus bar 120 may be electrically connected to an external terminal.

Figure 4:
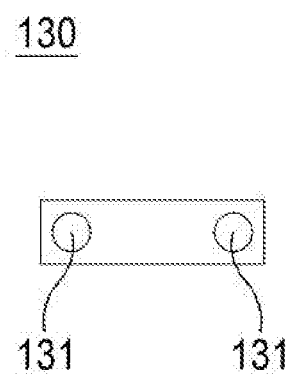
FIG. 4 is a view schematically showing an inter bus bar provided in the bus bar assembly according to the embodiment of the present invention.
Figure 5:
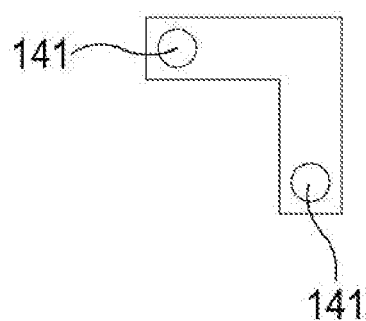
FIG. 5 is a view schematically showing a terminal bus bar provided in the bus bar assembly according to the embodiment of the present invention.

As shown in FIG. 4, the inter bus bar 130 may be formed in a straight shape. The inter bus bar 130 may have a length capable of connecting two sensing bus bars 120 to each other. The inter bus bar 130 may have two contact points 131, and the two contact points 131 may be connected to contact points 121 of two sensing bus bars 120, respectively, by welding, etc.

As shown in FIG. 4, the terminal bus bar 140 may be formed in a shape that is bent so as to have an approximately L shape. The terminal bus bar 140 may have a length capable of connecting a sensing bus bar 120 to an external terminal. The terminal bus bar 140 may have two contact points 141, wherein one of the two contact points 141 may be connected to a contact point 121 of a sensing bus bar 120 by welding, etc., and the other may be connected to an external terminal by welding, etc. Consequently, the sensing bus bar 120 may be electrically connected to the external terminal via the terminal bus bar 140.

According to the embodiment of the present invention, the bus bar assembly 100 may include two types of frames 111 and 112, one type of inter bus bars 130, and one type of terminal bus bars 140, and circuits having various forms may be simply constructed using these components.

Figure 6:
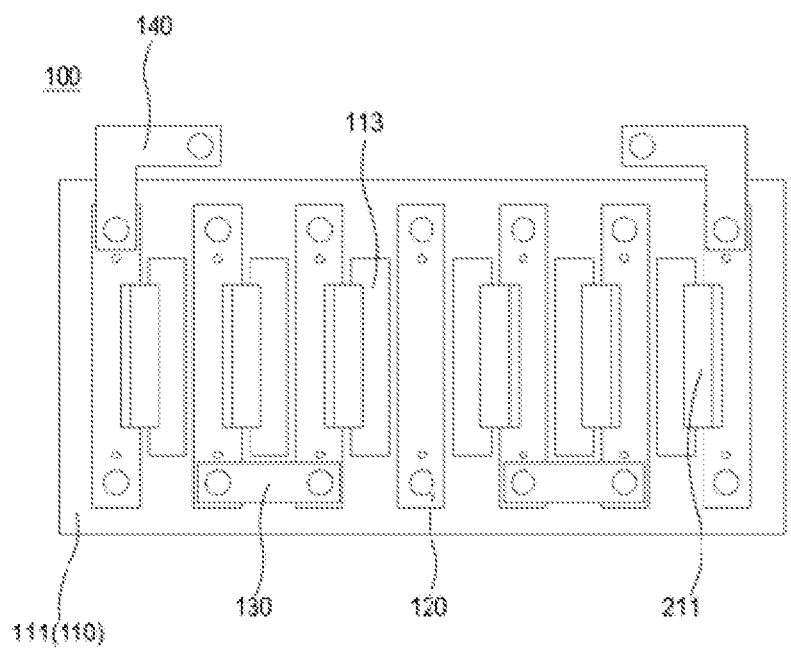
FIGS. 6 and 7 are views schematically showing examples in which a two-parallel circuit is constructed using the first type frame, the inter bus bar, and the terminal bus bar.
Figure 7:
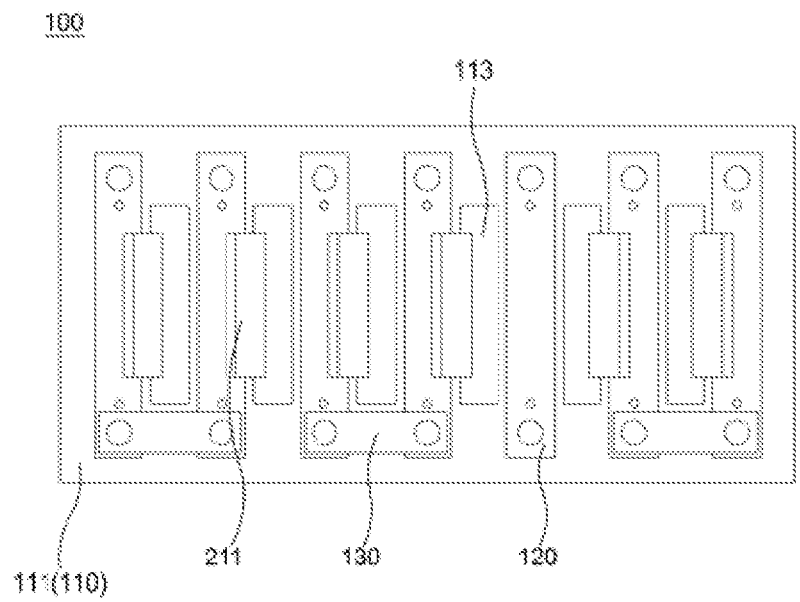

For example, as shown in FIG. 6, a first type frame 111 may be disposed at the front side of the battery cell assembly 200, as shown in FIG. 7, a first type frame 111 may be disposed at the rear side of the battery cell assembly 200, inter bus bars 130 and terminal bus bars 140 may be connected to sensing bus bars 120, and electrode leads 211 may be connected to the sensing bus bars 120, whereby a two-parallel circuit may be constructed. Here, the two-parallel circuit is a circuit in which two groups of battery cells 210, which are constructed by connecting each six battery cells 210, among 12 battery cells 210, to each other in series, are connected to each other in parallel.

Figure 8:
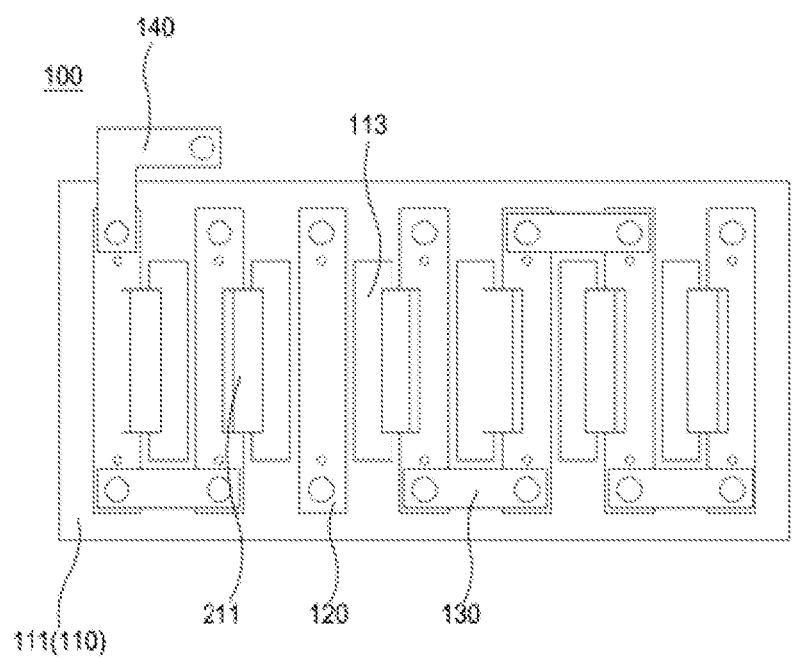
FIGS. 8 and 9 are views schematically showing examples in which a four-parallel circuit is constructed using the first type frame, the inter bus bar, and the terminal bus bar.
Figure 9:
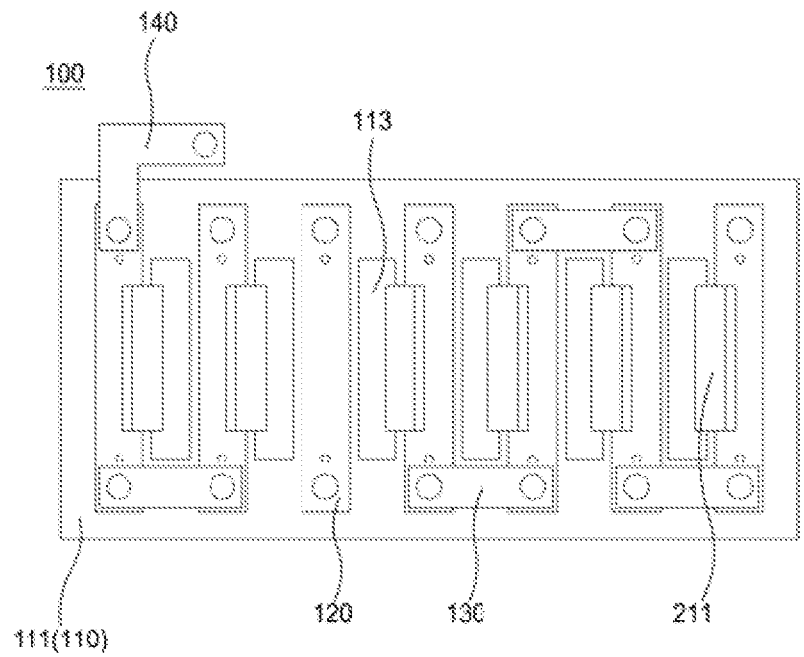

In addition, as shown in FIG. 8, a first type frame 111 may be disposed at the front side of the battery cell assembly 200, as shown in FIG. 9, a first type frame 111 may be disposed at the rear side of the battery cell assembly 200, inter bus bars 130 and terminal bus bars 140 may be connected to sensing bus bars 120, and electrode leads 211 may be connected to the sensing bus bars 120, whereby a four-parallel circuit may be constructed. Here, the four-parallel circuit is a circuit in which four groups of battery cells 210, which are constructed by connecting each three battery cells 210, among 12 battery cells 210, to each other in series, are connected to each other in parallel.

Figure 10:
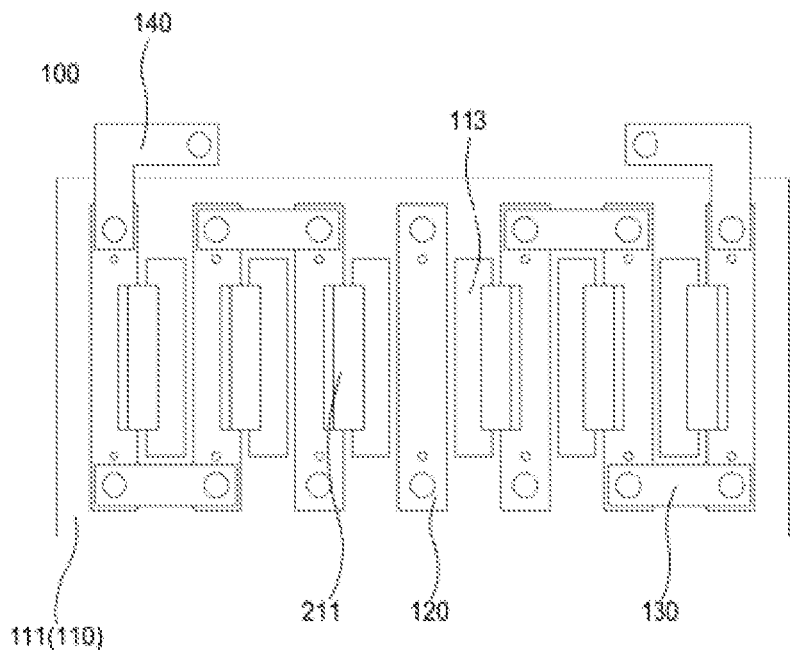
FIGS. 10 and 11 are views schematically showing examples in which a six-parallel circuit is constructed using the first type frame, the inter bus bar, and the terminal bus bar.
Figure 11:
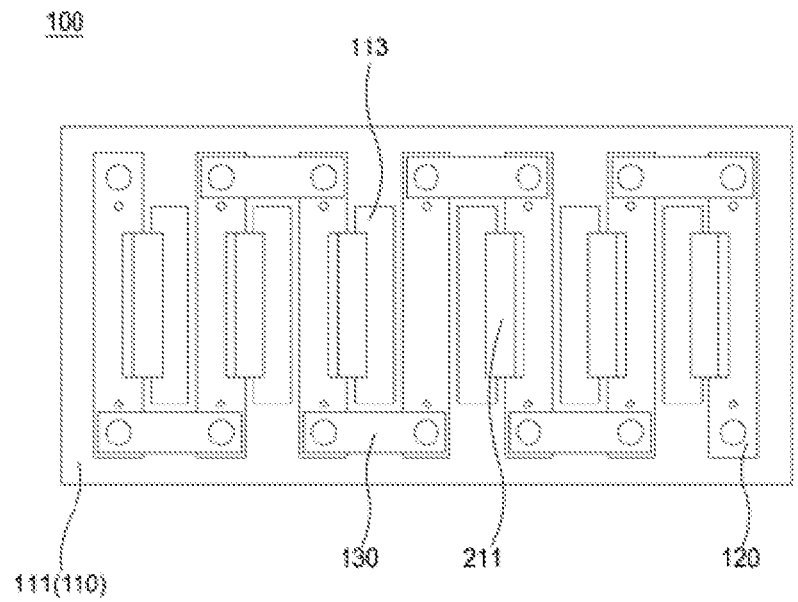

In addition, as shown in FIG. 10, a first type frame 111 may be disposed at the front side of the battery cell assembly 200, as shown in FIG. 11, a first type frame 111 may be disposed at the rear side of the battery cell assembly 200, inter bus bars 130 and terminal bus bars 140 may be connected to sensing bus bars 120, and electrode leads 211 may be connected to the sensing bus bars 120, whereby a six-parallel circuit may be constructed. Here, the six-parallel circuit is a circuit in which six groups of battery cells 210, which are constructed by connecting each two battery cells 210, among 12 battery cells 210, to each other in series, are connected to each other in parallel.

Figure 12:
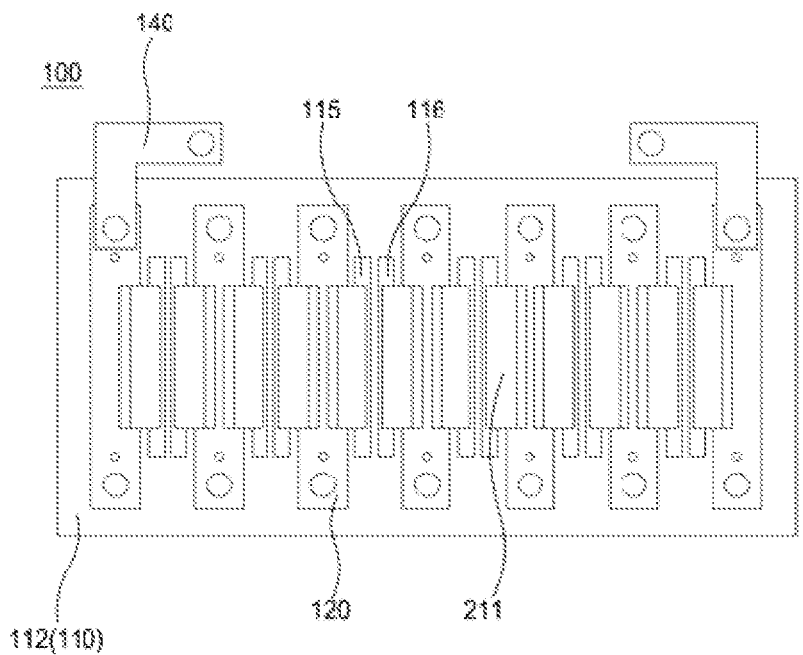
FIGS. 12 and 13 are views schematically showing examples in which a series circuit is constructed using the first and second type frames, the inter bus bar, and the terminal bus bar.
Figure 13:
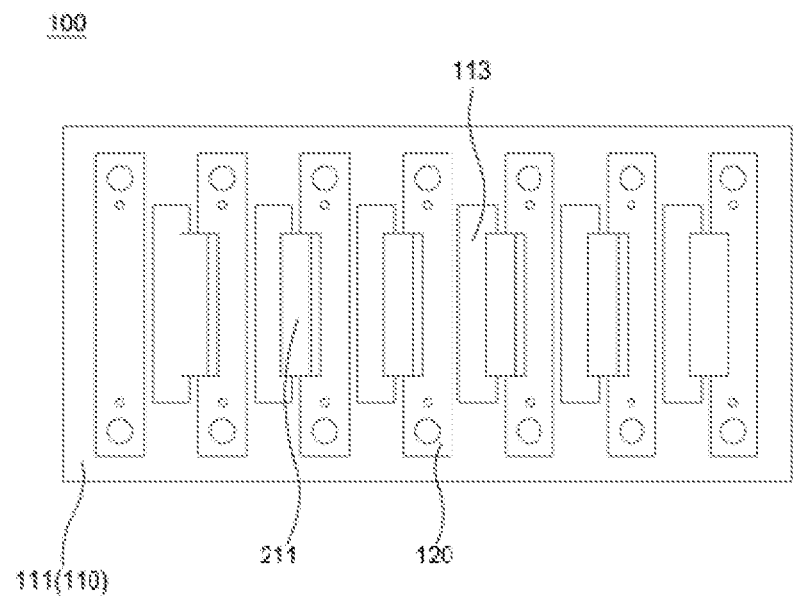

In addition, as shown in FIG. 12, a second type frame 112 may be disposed at the front side of the battery cell assembly 200, as shown in FIG. 13, a first type frame 111 may be disposed at the rear side of the battery cell assembly 200, inter bus bars 130 and terminal bus bars 140 may be connected to sensing bus bars 120, and electrode leads 211 may be connected to the sensing bus bars 120, whereby a series circuit may be constructed. Here, the series circuit is a circuit in which 12 battery cells 210 are connected to each other in series.

Figure 14:
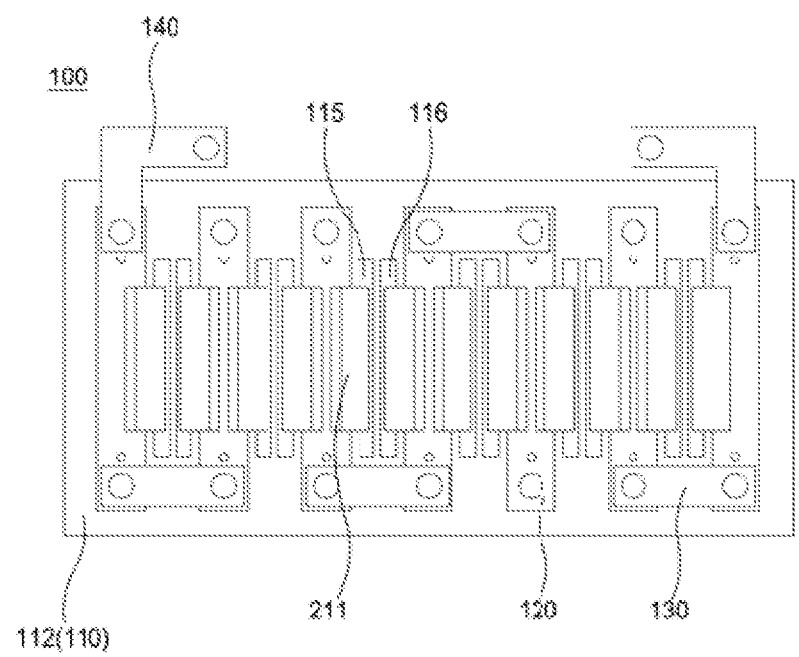
FIGS. 14 and 15 are views schematically showing examples in which a three-parallel circuit is constructed using the first and second type frames, the inter bus bar, and the terminal bus bar.
Figure 15:
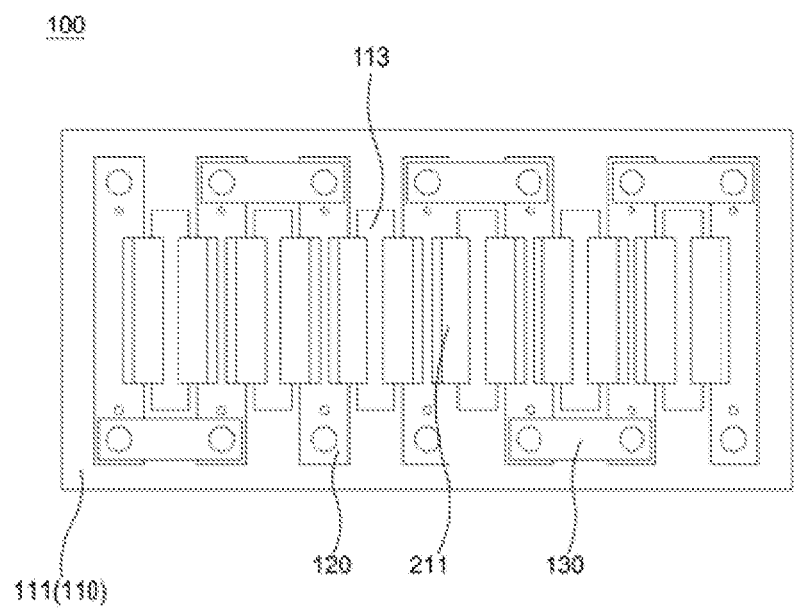

In addition, as shown in FIG. 14, a second type frame 112 may be disposed at the front side of the battery cell assembly 200, as shown in FIG. 15, a first type frame 111 may be disposed at the rear side of the battery cell assembly 200, inter bus bars 130 and terminal bus bars 140 may be connected to sensing bus bars 120, and electrode leads 211 may be connected to the sensing bus bars 120, whereby a three-parallel circuit may be constructed. Here, the three-parallel circuit is a circuit in which three groups of battery cells 210, which are constructed by connecting each four battery cells 210, among 12 battery cells 210, to each other in series, are connected to each other in parallel.

According to the embodiment of the present invention, as described above, the bus bar assembly 100 may be constituted by any one type of frames selected from between two types of frames 111 and 112, one type of inter bus bars 130, and one type of terminal bus bars 140, and circuits having various forms may be constructed using these components. Consequently, the construction of the bus bar assembly may be simplified, compared to the case in which a plurality of components having various forms is combined and used in order to construct circuits having various forms, and costs may be reduced as a result of simplification of the components. In addition, resources and costs required to develop respective components may be reduced through unification of the components.

Although the preferred embodiments of the present invention have been described by way of illustration, the scope of the present invention is not limited to the specific embodi-

DESCRIPTION OF REFERENCE NUMERALS

100: bus bar assembly
200: battery cell assembly
110: frames
120: sensing bus bars
130: inter bus bars
140: terminal bus bars

INDUSTRIAL APPLICABILITY

According to an embodiment of the present invention, a bus bar assembly may be constituted by any one type of frames selected from between two types of frames, one type of inter bus bars, and one type of terminal bus bars, and circuits having various forms may be constructed using these components. Consequently, the construction of the bus bar assembly may be simplified, compared to the case in which a plurality of components having various forms is combined and used in order to construct circuits having various forms, and costs may be reduced as the result of simplification of the components. In addition, resources and costs required to develop respective components may be reduced through unification of the components.

The invention claimed is:

1. A bus bar assembly comprising:
a first type frame having a plurality of through-holes including a single through-hole, through which two electrode leads of a plurality of battery cells extend together;
a second type frame having a plurality of through-holes including two through-holes, through which two electrode leads of a plurality of battery cells extend, respectively;
wherein one of the first and second type frame is an assembly frame;
a plurality of sensing bus bars integrally formed on the assembly frame by adding a material constituting the assembly frame to the plurality of sensing bus bars;
an inter bus bar configured to connect any one pair of sensing bus bars, among the plurality of sensing bus bars, to each other, wherein the inter bus is not integrally formed on the assembly frame; and
a terminal bus bar configured to connect any one of the plurality of sensing bus bars to an external terminal, wherein the terminal bus bar is not integrally formed on the assembly frame,
wherein in the first type frame, the single through-hole is formed between any one pair of sensing bus bars, among the plurality of sensing bus bars, and
wherein in the second type frame, the two through-holes are formed between any one pair of sensing bus bars, among the plurality of sensing bus bars.

2. The bus bar assembly according to claim 1, wherein each sensing bus bar of the plurality of sensing bus bars is formed in a straight shape and has two contact points.

3. The bus bar assembly according to claim 2, wherein the inter bus bar is formed in a straight shape and has two contact points connected respectively to contact points of any one pair of sensing bus bars, among the plurality of sensing bus bars.

4. The bus bar assembly according to claim 2, wherein the terminal bus bar is formed in a bent shape and has two contact points connected respectively to one of the two contact points of one of the plurality of sensing bus bars and to the external terminal.

5. A battery module having a plurality of battery cells and the bus bar assembly according to claim 1.

6. A battery pack comprising a battery module having a plurality of battery cells and the bus bar assembly according to claim 1.

* * * * *